United States Patent [19]
Khan

[11] Patent Number: 4,764,849
[45] Date of Patent: Aug. 16, 1988

[54] DATA BUS DISTRIBUTION APPARATUS

[75] Inventor: Safina J. Khan, Wheaton, Ill.

[73] Assignee: Motorola, Inc., Schaumburg, Ill.

[21] Appl. No.: 944,642

[22] Filed: Dec. 19, 1986

[51] Int. Cl.[4] .............................................. H02B 1/20
[52] U.S. Cl. .................................... 361/428; 361/352;
361/429; 439/43; 439/49
[58] Field of Search ............... 361/398, 352, 468, 412,
361/413, 428–429; 379/326, 327, 332; 439/43,
49, 50

[56] References Cited
U.S. PATENT DOCUMENTS

| 717,194 | 12/1902 | Hewlett | 361/352 |
|---|---|---|---|
| 3,721,863 | 3/1973 | Hardouin et al. | 439/43 |
| 4,195,896 | 1/1980 | Wagner et al. | 361/352 |
| 4,420,793 | 12/1983 | Strandberg | 361/413 |

FOREIGN PATENT DOCUMENTS 3412131 10/1985 Fed. Rep. of Germany ...... 379/327

OTHER PUBLICATIONS

ANSI/IEEE Std. 802.3-1985, Local Area Networks, Dec. 31, 1984, Section 8-pp. 95-123, pp. 130-132.
Motorola, Inc., Dyna T*A*C ID Series Cellular Mobile Telephone Integrated Base Station Instruction Manual No. 68P81069E05-O, Jul. 8, 1985, Integrated Base Station Backplane (section #68P81071E19-O), Diagram PEPS42156-O (sheets 1 & 2).
Motorola, Inc., Fixed Network Equipment Instruction Manual No. 68P81053E50, Apr. 15, 1984, pp. 27-32.
Motorola, Inc., Starplex OCTTT Instruction Manual No. 68P81060E75-O, May 1, 1982, Equipment Shelves and Interconnect Board Section 68P81061E96-O, pp. 1-9.

Primary Examiner—J. R. Scott
Assistant Examiner—Gregory D. Thompson
Attorney, Agent, or Firm—Raymond A. Jenski; Rolland R. Hackbart; Donald B. Southard

[57] ABSTRACT

A coaxial data bus distribution apparatus for coupling a variable number of peripheral devices to the data bus with a predetermined electrical distance between each point of coupling. A coaxial cable of predetermined length is connected between the output connector of a first input-output pair of coaxial connectors and the input of a second pair of coaxial connectors. Connection between the coaxial connector pair, mounted on a bus interconnect board, and a peripheral device is made by a predetermined length two wire non-coaxial connection to a peripheral device back plane.

8 Claims, 3 Drawing Sheets

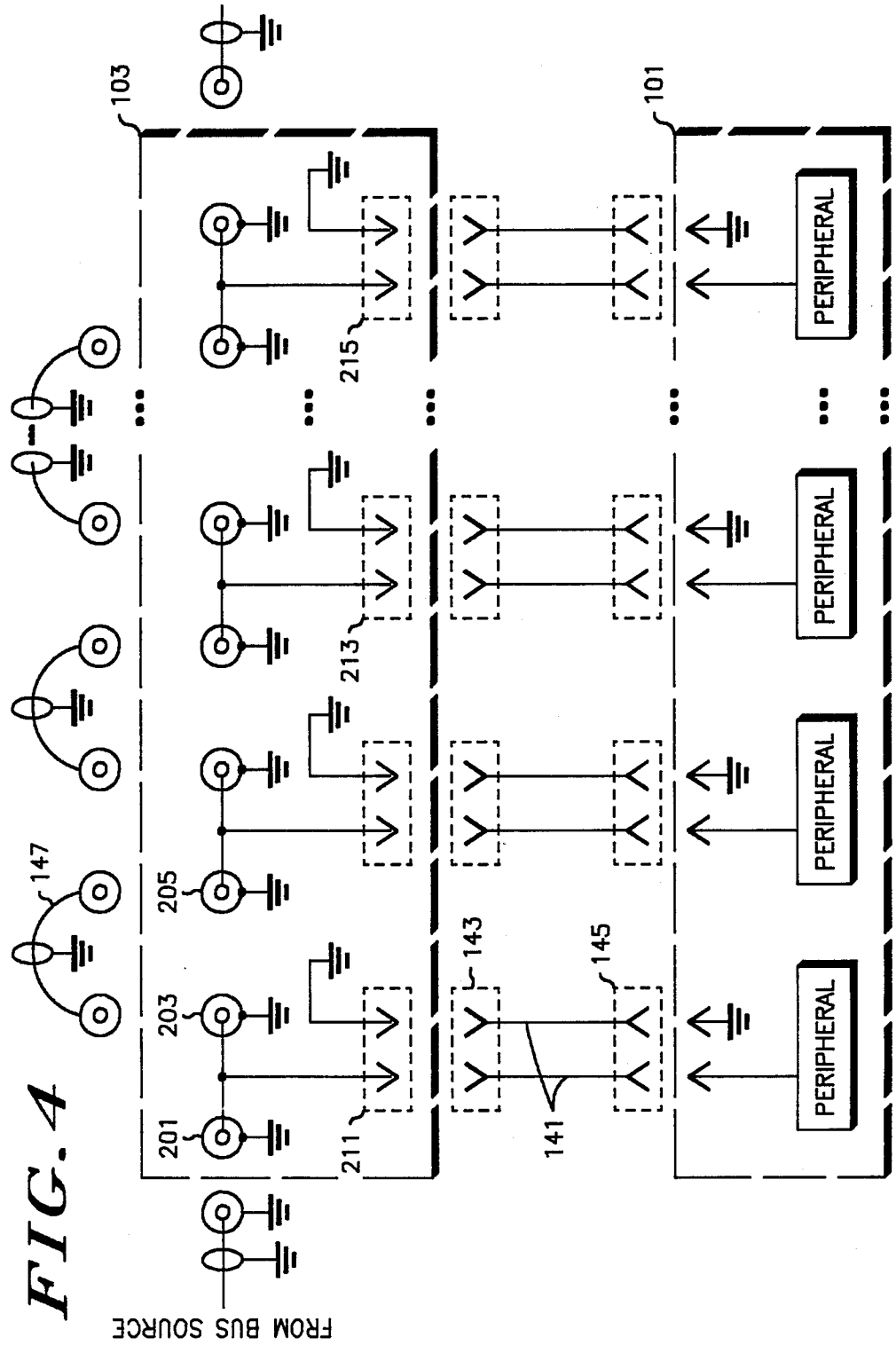

DATA BUS DISTRIBUTION APPARATUS

BACKGROUND OF THE INVENTION

This invention relates generally to the data bus distribution apparatus and more particularly to the means for providing distributive electrical loading on a data bus having a variable number of peripheral devices such as would be encountered in a Local Area Network (LAN).

Data bus distribution among a number of peripheral devices is subject to electrical loading by the impedances of the peripheral devices which may be connected to the data bus. Ideally, the peripheral devices have an infinite real impedance which has no effect on a serial data bus of fixed characteristic impedance. Realizable peripheral devices, however, have a high (but not infinite) impedance which consists of both real and imaginary components. When a plurality of peripheral devices are connected in parallel on the data bus, the combined effect disturbs the characteristic impedance of the data bus resulting in improper data waveform transmission on the bus.

To correct this problem, specifications have been developed which define the maximum allowable impedance loading from a peripheral device and which specify that this loading should be distributed along the transmission line forming the data bus. One such specification is the Local Area Network ANSI/IEEE Std. 802.3-1985 ("Ethernet") which describes a means of attaching a plurality of devices to the local network medium via a multi-tap coaxial cable. The attachment of devices is made only at 2.5 m. intervals so that reflections from the non-infinite impedance of the devices do not add in-phase.

In order to realize a data bus distribution system which can accommodate a variable number of peripheral devices, it has been desirable to make the peripheral devices insertable and removable from the bus. This variability, however, causes the electrical distance between the peripheral devices on the data bus transmission line to change. In critical systems, this change can be unacceptable when a fixed transmission line technique is used. (Such a fixed transmission line technique has been employed in relatively tolerant analog multiplex systems such as that described in the Starplex TM CCIIT Multiplex Instruction Manual No. 68P81060E75-O available from Motorola, Inc., 1301 Algonquin Rd, Schaumburg, IL).

Those faced with similar problems in other technologies have run a copper foil trace forming a transmission line as part of a printed circuit board to each removable element and have not addressed the variable electrical distance between removable elements using the transmission line. Specifically, a multiple channel telephone multiplex system such as that shown in the above Starplex TM Multiplex Instruction Manual, pp. 1-9 (Equipment Shelves & Interconnect Boards Section), utilizes a copper foil trace to distribute a high frequency baseband among a variable number of "channel modems". A single "baseband BNC connector" assembly plugs into pins which protrude from the basis interconnect board and enable connection of the baseband to external circuitry. The electrical distance between these channel modems which are plugged into the interconnect board changes as the slots into which the channel modems are plugged change.

SUMMARY OF THE INVENTION

It is, therefore, one object of the present invention to provide a distributed electrical loading on a coaxial data bus.

It is a further object of the present invention to enable a variable number of peripheral devices to be placed on the data bus while maintaining the distributed loading and constant electrical spacing between the peripheral devices.

It is a further object of the present invention to yield a device for simple and cost effective interconnection between the data bus and each peripheral device.

Accordingly, these and other objects are realized in the present invention encompassing a coaxial serial data bus distribution apparatus which provides distributive loading to the data bus from a variable number of peripheral devices electrically spaced at essentially equal electrical distances. Each peripheral device is connected through a first circuit board which includes a plurality of connectors. A second circuit board has a plurality of coaxial connectors electrically connected together in pairs via the second circuit board to provide input-output connections to the data bus. Additionally, a non-coaxial connector is electrically connected to each of the coaxial connector pairs on the second circuit board. Coaxial cables, each having a predetermined length and coaxial connectors at each end, serially connect the coaxial connector pairs output to input. A plurality of wires, each having a non-coaxial connector at each end, connects the coaxial connector pair to the connectors on the first circuit board via the associated non-coaxial connector on the second circuit board.

BRIEF DESCRIPTION OF THE DRAWINGS

FIG. 4 is a schematic diagram of the electrical interconnection which may be employed in the present invention.

DESCRIPTION OF THE PREFERRED EMBODIMENT

Figure 1:
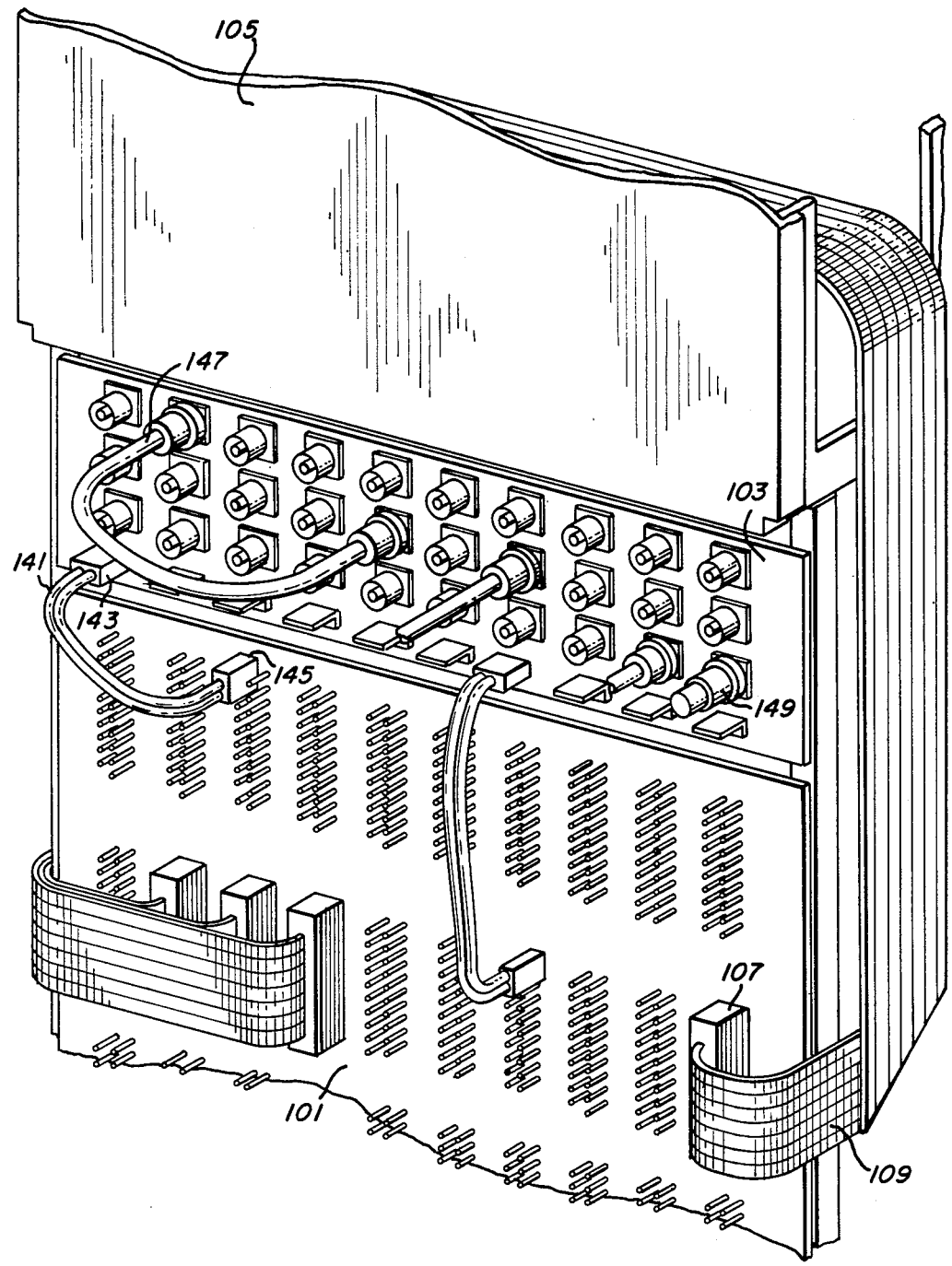
FIG. 1 is a perspective drawing of an equipment rack with card cage and distribution panel illustrating a configuration which employs the present invention.

The present invention provides an interconnect point for peripheral devices in a 10 MHz Carrier Sense Multiple Access/Collision Detect (CSMA/CD)local area network (LAN). The present invention is particularly useful in the switching exchange equipment of a mobile radio telephone system where it provides general purpose common channel signalling (CCS) for interexchange communications meeting both domestic and international standards. In a preferred embodiment, up to 24 peripheral devices may be added to the 10 MHz bus as desired. Such a preferred embodiment is shown in the perspective drawing of FIG. 1. This figure is indicative of the equipment which could be found in a LAN peripheral equipment bay of telephone switching exchange such as an EMX 250/500 available from Motorola, Inc. Here, a card cage rack assembly (not shown) supports a peripheral device back plane 101, a bus interconnect board 103, and other mechanical assemblies 105. Peripheral devices plug into the peripheral device back plane 101 from the side opposite that side shown in FIG. 1. These peripheral devices, in the preferred embodiment, are Signalling Terminal Boards (STB) or LAN Interface Boards (LANI) which provide LAN interface and communicate information between the telephone switching exchange and the LAN. Actual electrical interface to the LAN is a conventional VLSI (very large scale integration) integrated circuit device.

Typically, the peripheral device back plane 101 is a printed circuit board of well-known construction and provides electrical interconnection to conventional multi-pin printed circuit board edge connectors which may be connectors such as part number 6346 available from Elco, Inc. which in turn may be connected to peripheral devices. Wire wrap pins extend from these printed circuit board edge connectors through the peripheral device back plane 101 to the side shown in FIG. 1 where they may be wire-wrapped in conventional fashion to provide intercoupling between the peripheral devices, power, ground, and other circuits. Additionally, connectors, such as connector 107, may be plugged in to the wire-wrapped pins to carry signals from the peripheral device back plane 101 to other circuits via multiconnector cable 109.

Figure 2:
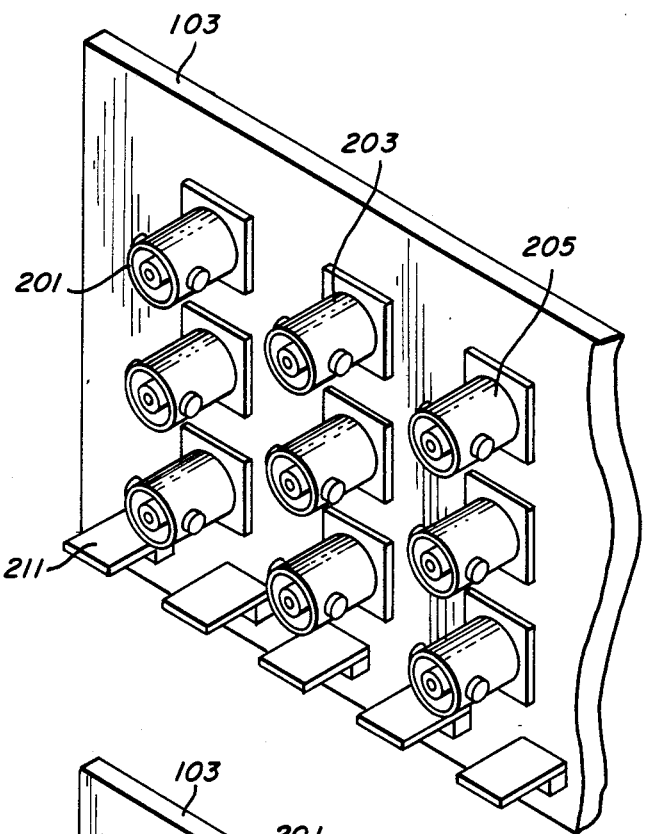
FIG. 2 is a sectioned perspective drawing of a circuit board upon which a plurality of coaxial connector pairs and a plurality of non-coaxial connectors may be mounted and which can be employed by the present invention.

The bus interconnect board 103 may be formed of conventional printed circuit board material and, in the preferred embodiment, holds and connects 48 BNC female connectors which may be part number R141426 available from Radiall Inc., or other suitable equipment and 24 4 pin non-coaxial male plugs which may be part number 22-29-2201 available from Molex, Inc. or suitable equivalent. The arrangement of the BNC coaxial connectors and the 4 pin plugs is shown in FIG. 2. In the preferred embodiment, the coaxial connectors are mounted in a 3 by 16 arrangement (represented in FIG. 2 as coaxial connectors 201, 203, and 205). Each coaxial connector is paired with another coaxial connector on the bus interconnect board 103 and an electrical connection is made between the center conductor of one coaxial connector to the center conductor of another paired coaxial connector. Additionally, an independent ground connection is made between each of the paired connectors on the bus interconnect board 103. Thus, in the preferred embodiment, coaxial connector 201 is paired with coaxial connector 203. A signal introduced into the center conductor terminal of coaxial connector 201 would be directly coupled to the center conductor terminal of coaxial connector 203. If a coaxial cable (having conventional mating male coaxial connectors) were connected to coaxial connector 203 and thence to coaxial connector 205, a signal introduced to coaxial connector 201 would appear at the coaxial connector paired with coaxial connector 205 (not shown). It can be seen that the pairs of connectors could be daisy-chained, or series connected, one pair to the next via coaxial cable and a signal introduced at coaxial connector 201 could be series connected to all of the coaxial connectors on the bus interconnect board 103 and appear at a last connector on the circuit board.

Each of the 24 non-coaxial connectors, such as connector 211, may also be mounted on the bus interconnect board 103. Each non-coaxial connector may be electrically connected to the center conductor interconnection between one pair of coaxial connectors as well as to the ground of the coaxial connector pair on the bus interconnect board 103. In the preferred embodiment, non-coaxial connector 211 has one of the connector pins electrically connected via circuit board runner to the the circuit board runner providing connection between the center conductor of coaxial connector 201 and the center conductor of coaxial connector 203. Another of the pins of non-coaxial connector 211 is connected to the ground connection of the coaxial connector pair 201–203 on bus interconnect board 103. Similarly, other non-coaxial connectors are individually connected to one coaxial connector pair throughout the remainder of the bus interconnect board 103. The end result, then, is a coaxial input (such as coaxial connector 201), a coaxial output (such as coaxial connector 203), and a non-coaxial connector (such as 211) tapping the signal which could be introduced into the input coaxial connector and taken out of the output coaxial connector. The entire bus interconnect board 103, therefore, provides up to 24 tapped connections.

Figure 3:
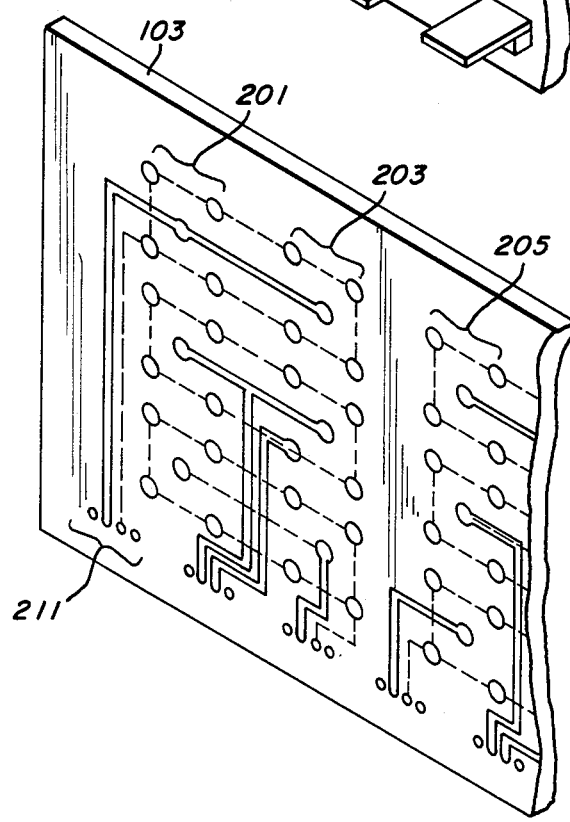
FIG. 3 is a sectioned perspective drawing of the wiring between the coaxial connectors and non-coaxial connectors of FIG. 2.

The circuit board wiring for the bus interconnect board 103 is shown in FIG. 3. The tap between input coaxial connector 201 and output coaxial connector 203 is shown leading to the non-coaxial connector 211. In the preferred embodiment, the circuit board has conductor traces on both sides to minimize the need for cross-overs. The invisible conductor traces are shown in dotted line.

Referring again to FIG. 1, connection is made between the bus interconnect board 103 and the peripheral device back plane 101 by a two wire pair 141. In the preferred embodiment, the tapped coaxial connection between coaxial connectors 201 and 203 is coupled to the two wire pair 141 via non-coaxial connector 211 and its mating female connector 143 which may be part number 22-01-2047 with 08-56-0109 available from Molex, Inc. or its equivalent, which is connected to one end of the two wire pair 141. A second non-coaxial female connector 145 is attached to the other end of the two wire pair 141 and is plugged into the wire-wrap pins of a predetermined card edge connector of the peripheral device back plane 101. Likewise, a similar connection is made between the other coaxial connector pairs in use via additional two wire pairs. Since it is desirable that the impedance of each tapped connection be maintained as high and as real as possible, the length of the two wire pairs, such as pair 141, is maintained at approximately 6.35 centimeters.

Further, since it is desirable to prevent the loading impedance of the peripheral device and its tapped connection from being presented to the coaxial bus at one electrical point, a predetermined length of coaxial cable is employed to connect one coaxial connector pair to another. The coaxial cable 147 makes such a connection and forms part of the coaxial cable bus shown schematically in FIG. 4. In the preferred embodiment, the coaxial cable has a characteristic impedance of 50 Ohms and is maintained at a length of 0.5 meters.

An equivalent electrical schematic diagram is shown in FIG. 4. In this schematic diagram the electrical coupling of the coaxial cable bus (of which cable 147 is a part) from one coaxial connector pair to another via coaxial cable can be visualized. Additionally, the non-coaxial connection between the bus interconnect board 103 and the peripheral device back plane 101 can be seen. In practice, a matching 50 Ohm termination 149 will be placed on the last used output coaxial connector.

It is a feature of the present invention that any number of peripheral devices may be connected to the bus at any given time with a constant electrical spacing between peripheral devices. Inclusion of a new peripheral device, in the preferred embodiment, can be accomplished by including a previously unused coaxial connector pair into the series connected chain of coaxial connector pairs and the tap between the bus and the peripheral device can be completed with the inclusion of a two wire pair. The electrical distance between the point of connection to the bus from peripheral device to peripheral device is maintained at approximately 0.5 meters regardless of the number of peripheral devices employed.

Referring again to FIG. 1, it can be seen that the 0.5 meter coaxial cables may be maintained in a loop structure by cable retention elements attached to other structures such as structure 105. This attachment allows for neat and controlled dressing of the plurality of cables.

In summary, then, an apparatus for coupling a variable number of peripheral devices to a fixed impedance data bus has been shown and described. The electrical distance between the point of connection of the peripheral devices may be maintained constant by utilizing a coaxial cable of predetermined length which is connected between the output connector of one input-output pair of coaxial connectors and the input of another pair. Connection between the coaxial connector pair mounted on a bus interconnect board and a peripheral device is made by a fixed length two wire non-coaxial connection to a peripheral device back plane. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

I claim:

1. A coaxial data bus distribution apparatus providing distributive loading to the bus from a variable number of peripheral device circuit interconnections at essentially equal electrical distances between interconnections, comprising:
   a first circuit board with a plurality of connectors mounted thereon;
   a second circuit board having mounted thereon at least: (a) a plurality of coaxial connectors, each said coaxial connector electrically coupled via said second circuit board to one other coaxial connector whereby a coaxial connector pair having an input and an output coaxial connector is identified for each said connector of said first circuit board, and (b) a plurality of non-coaxial connectors, each said non-coaxial connector electrically coupled to a respective one of said coaxial connector pairs;
   a plurality of coaxial cables of predetermined length, each coaxial cable connected between a selected output of one of said coaxial connector pairs and a selected input of another of said coaxial connector pairs, whereby said plurality of coaxial connector pairs may be series coupled; and
   a plurality of wires of predetermined length and terminating at each end with a non-coaxial connector, each of said plurality of wires connected between a selected one of said second circuit board non-coaxial connectors and a selected one of said first circuit board connectors.

2. A coaxial data bus distribution apparatus in accordance with claim 1 wherein said coupling of each said plurality of non-coaxial connectors to a respective one said coaxial connector pair further comprises a coupling to a center conductor of said coaxial pair and a coupling to a ground conductor of said coaxial pair.

3. A coaxial data bus distribution apparatus in accordance with claim 1 wherein said coaxial cable predetermined length further comprises a length approximately equal to 0.5 meters.

4. A coaxial data bus distribution apparatus in accordance with claim 1 wherein said wire predetermined length further comprises a length approximately equal to 6.35 centimeters.

5. A radiotelephone exchange common channel signalling (CCS) apparatus providing an interface between a local area network (LAN) and a variable number of peripheral devices in which each peripheral device connects to the coaxial cable bus of the LAN at essentially equal electrical distances between the connections, comprising:
   a peripheral device back plane with a plurality of connectors mounted thereon;
   a bus interconnect board having mounted thereon at least: (a) a plurality of coaxial connectors, each said coaxial connector electrically coupled via said bus interconnect board to one other coaxial connector whereby a coaxial connector pair having an input and an output coaxial connector is identified for each said connector of said peripheral device back plane, and (b) plurality of non-coaxial connectors, each said non-coaxial connector electrically coupled to a respective one of said coaxial connector pairs;
   a plurality of coaxial cables of predetermined length, terminating at each end with a coaxial connector, each coaxial cable connected between a selected output of one of said coaxial connector pairs and a selected input of another of said coaxial connector pairs, whereby said plurality of coaxial connector pairs may be series coupled; and
   a plurality of wires of predetermined length and terminating at each end with a non-coaxial connector, each of said plurality of wires connected between a selected one of said bus interconnect board non-coaxial connectors and a selected one of said peripheral device back plane connectors.

6. A radiotelephone exchange common channel signalling apparatus in accordance with claim 5 wherein said coupling of each said plurality of non-coaxial connectors to a respective one said coaxial connector pair further comprises a coupling to a center conductor of said coaxial pair and a coupling to a ground conductor of said coaxial pair.

7. A radiotelephone exchange common channel signalling apparatus in accordance with claim 5 wherein said coaxial cable predetermined length further comprises a length approximately equal to 0.5 meters.

8. A radiotelephone exchange common channel signalling apparatus in accordance with claim 5 wherein said wire predetermined length further comprises a length approximately equal to 6.35 centimeters.

* * * * *